United States Patent [19]

Norris

[11] Patent Number: 5,276,291
[45] Date of Patent: Jan. 4, 1994

[54] ACOUSTIC MUFFLER FOR HIGH VOLUME FLUID FLOW UTILIZING HELMHOLTZ RESONATORS WITH LOW FLOW RESISTANCE PATH

[76] Inventor: Thomas R. Norris, 15 Patricia Rd., Orinda, Calif. 94563

[21] Appl. No.: 911,855

[22] Filed: Jul. 10, 1992

[51] Int. Cl.⁵ ............................................. E04F 17/04
[52] U.S. Cl. ................................. 181/224; 181/250; 181/276
[58] Field of Search ............... 181/224, 229, 249, 250, 181/255, 266, 269, 273, 276, 286, 292

[56] References Cited

U.S. PATENT DOCUMENTS

| | | |
|---|---|---|
| 3,353,626 | 11/1967 | Cremer . |
| 3,353,628 | 11/1967 | Cremer . |
| 3,435,911 | 4/1969 | Greenheck . |
| 3,511,336 | 5/1970 | Rink . |
| 3,568,791 | 3/1971 | Luxton . |
| 3,580,357 | 5/1971 | Whitney . |
| 3,696,883 | 10/1972 | Devane . |
| 3,738,448 | 6/1973 | Vér . |
| 3,823,796 | 7/1974 | Damiron . |
| 3,826,331 | 7/1974 | Scharton . |
| 3,830,335 | 8/1974 | Zorumski ............... 181/224 |
| 3,854,548 | 12/1974 | Suzuki . |
| 3,888,331 | 6/1975 | Wang . |
| 3,948,346 | 4/1976 | Schindler . |
| 3,948,348 | 4/1976 | Bychinsky . |
| 3,948,349 | 4/1976 | Bychinsky . |
| 4,091,892 | 5/1978 | Hehmann et al. ............ 181/286 |
| 4,182,430 | 1/1980 | Gorchev . |
| 4,313,522 | 2/1982 | Gorchev . |
| 4,313,523 | 2/1982 | Copen . |
| 4,313,524 | 2/1982 | Rose . |
| 4,316,522 | 2/1982 | Hirschorn . |
| 4,346,781 | 8/1982 | Ingard . |
| 4,359,136 | 11/1982 | Eriksson . |
| 4,360,075 | 11/1982 | Blaser . |
| 4,645,032 | 2/1987 | Ross et al. ............ 181/224 X |
| 4,787,473 | 11/1988 | Fuchs et al. ............ 181/224 |

OTHER PUBLICATIONS

"Design & Performance of Resonant-Cavity Parallel Baffles for Duct Silencing", *Noise Control Engineering*, Jul.-Aug. 1981, P. T. Soderman.

*Primary Examiner*—Michael L. Gellner
*Assistant Examiner*—Khanh Dang
*Attorney, Agent, or Firm*—Townsend and Townsend

[57] ABSTRACT

A compact resonating muffler is disclosed. Specifically, the muffler is a part of a duct which is preferably rectilinear with an aspect ratio in the order of 3 to 1. The muffler contains at least two and preferably three or more rows or lines of Helmholtz type resonators placed on at least one side of the muffler housing. Preferably, the resonators are on opposite sides of the duct, these sides being opposite major sides when the duct is rectilinear. The first row of the resonators is tuned for attenuation of the major acoustical frequency to be muffled. The second row of the resonators is tuned to exclude the major damped frequency. Preferably, this row of resonators is tuned to harmonics of the major frequency. Finally, the third and last row of resonators is tuned again to muffle the primary frequency, this exact resonant frequency preferably being slightly different from the frequency of the first row of resonators. The entrance to the Helmholtz resonators constitutes elongate openings disposed with their major opening axis length parallel to the direction of fluid flow and at least one and one quarter times their respective minor axis widths. This presents a flow surface with little resistance to the passing flow and resonator opening which do not appreciably degrade the tuned frequency performance of the Helmholtz resonators.

21 Claims, 2 Drawing Sheets

ACOUSTIC MUFFLER FOR HIGH VOLUME FLUID FLOW UTILIZING HELMHOLTZ RESONATORS WITH LOW FLOW RESISTANCE PATH

This invention relates to mufflers utilized in high volume gas flows. More particularly, a muffler designed to attenuate discrete narrow band noise emissions of large amplitude is disclosed which uses one or more rows of frequency trapping resonators, preferably in a series of successive fundamental and fundamental-excluding resonators. In this disclosure, longitudinal openings parallel to the path of the gas flow form entrance to Helmholtz type resonators. Consequently, noise in the high volume flow is damped in discrete narrow bands with the face of the resonators forming a low resistance flow path to the passing high pressure, high volume gas—such as compressed air.

BACKGROUND OF THE INVENTION

The type of muffler which is the subject matter of this invention can best be understood by specific reference to an environment in which the muffler can reside.

It is known that fluidized bed combustion chambers can burn sulfur type fuels with low pollution emission. Consequently, coal or coke having a high sulfur content can be burned in fluidized bed combustion chambers with the sulfur liberated in combustion being converted to calcium sulfate. Unfortunately, to maintain the fluidized beds in an operative state, high volume, high pressure air flow is required.

The need for this high volume, high pressure air flow can be simply understood. Fluidized beds comprise a solid granular mass held with in a confined bed. Air is introduced from the bottom of the bed and exits from the top of the bed. During its upward flow, the air passes around the particulate matter within the bed, keeping the particles of the bed in a fluidized suspension. Indeed, the mass of the fluid bed looks and acts not unlike a liquid.

Such fluidized beds are particularly advantageous for chemical and combustion processes. In the example here, heat is produced by the combustion while a chemical reaction purges the sulfur from the combustion and discharges the sulfur as calcium sulfate.

Unfortunately, such fluidized beds require high volume, high pressure air flow. In the example here, rotating turbo fan machinery produces air outflow in the range of 40,000 to 80,000 cubic feet per minute at a discharge pressure of 3 to 4 psi. The term high pressure is used in this disclosure to distinguish the more usual case where such rotating turbo fan machinery operates at pressures of about 1 psi.

It will be understood that this muffler is also effective at low pressure, that is, 1 psi and below.

It is known to muffle the inlets to such rotating turbo fan machinery. A more difficult problem is the muffling of the outlet of such turbo fan machinery. The muffler herein can be used at either inlet or outlet.

Although rotating fan turbo machinery constitutes the major use of the muffler herein, the muffler could as well be used with certain piston type installations. Acoustically, the sound output must include relatively narrow band acoustical emissions including a fundamental frequency which is usually directly a function of the turbo fan or piston frequency.

Regarding the outlets of such compressors, these outputs commonly are contained in strong steel ducts leading from the discharge of the turbo fan machinery to the inlet of the fluidized bed. By way of example, ⅜ inch steel duct can be used surrounded by a 4" layer of fiberglass insulation which is in turn covered by a lead sheath. The discharge duct is rather large—being in the order of six feet long and one foot wide.

Even with a duct constructed and sound insulated as described, the sound on the outlet side of the duct can be excessive. In the case of a particular power plant, the sound generated by the rotating turbo fan machinery was so excessive that the entire plant could not be operated—until the muffler of this invention could be designed and installed. The unmuffled noise of the power plant included a low frequency rumble that could almost not be heard, a loud rushing and hissing sound at high level, and a series of other tones and whines that in combination sounded not unlike a series of sirens.

It should be understood that sound propagating through the acoustically insulated discharge duct was not the only problem. Actual damage to the duct work occurred in an operating period that was about 90 days. Fatigue failure of metal with cracking of the duct at the fan discharge occurred. In short, without muffling, such plants can constitute an aggravated noise nuisance with impractical short operating lifetimes of their required duct work.

It will be understood that the muffling requirement is unusual. Conventional mufflers having large pressure losses cannot be used. If substantial pressure loss occurs, insufficient pressure will remain for the fluidized bed operation or alternatively, excessive energy will be consumed in generating the required high volume, high pressure fluid flow.

SUMMARY OF THE PRIOR ART

In Zorumski U.S. Pat. No. 3,830,335 issued Aug. 20, 1974 entitled Noise Suppressor, a tuned noise suppressor of the type illustrated here is disclosed. Resonating concavities are formed in annular rings about a duct having the flow to be muffled. The rings of resonators are in series; that is the fluid flows by the discrete rings one after another.

The acoustically absorbent annular rings have resonating concavities with dissimilar dimensions. In the preferred embodiment, the resonating concavities of the first rings are tuned to the primary discrete frequency to be attenuated. The resonating concavities of the second rings are tuned to a frequency that is of a higher frequency incompatible with the frequency of the first rings. Such an arrangement causes the sound trapped by the first resonators to be reflected back towards the noise generating source—the turbo fan machinery. Only a portion of the generated rotating turbo machinery noise is transmitted downstream.

By the expedient of repeating the resonating concavity arrangement in a repeating serial sequence, relatively great sound attenuation can occur.

Unfortunately, such noise suppressors have heretofore not been acceptable for high pressure, high volume fluid flow. Specifically, the resonator cavities can become a significant source of pressure loss. The passing airflow is trapped by and partially diverted into such resonator concavities. Relatively large flow losses can occur.

SUMMARY OF THE INVENTION

A compact resonating muffler for use with a compressor such as a rotating turbo fan compressor is disclosed for placement within the relatively narrow confines of a discharge duct from high pressure, high volume turbo fan compressor. Specifically, the muffler is a part of a duct which is preferably rectilinear with an aspect ratio in the order of 3 to 1, (for example a duct of the dimension of about six feet wide and 1 to 1½ feet high can be used). The duct has at least 30% of the frontal cross section constituting the flow passage, with the remaining frontal cross-section being taken by the resonator cavity. The housing containing the muffler is usually without a taper—although it can be tapered, usually with the muffler inlet constituting the narrow dimension and the outlet the enlarged dimension.

The muffler contains at least two and preferably three or more rows or lines of Helmholtz type resonators in series placed on at least one side of the muffler housing. Preferably, the resonators are on opposite sides of the duct, these sides being opposite major sides when the duct is rectilinear. The first row of the resonators is tuned for attenuation of the major acoustical frequency to be muffled. The second row of the resonators is tuned to a higher frequency to exclude the major damped frequency. Preferably, this row of resonators is tuned to harmonics of the major frequency. Finally and optionally, the third and last row of resonators is tuned again to muffle the primary frequency, this frequency usually being slightly different from the frequency of the first row of resonators to provide a broader attenuation band. The third row of resonators can be different if a wider bandwidth of attenuation is required. Ranges of up to 33% difference can be used.

The entrance to the Helmholtz resonators constitutes elongate openings disposed with their major opening axis length parallel to the direction of fluid flow and this length being at least one and one quarter times their respective minor axis widths of the openings. The openings to the resonators define from 5 to 75% of the flow surface covering the resonators over which the gas flows. This presents a relatively smooth flow surface with little resistance to the passing flow and resonator openings which do not appreciably degrade the tuned frequency performance of the Helmholtz resonators. Thus, sound may easily pass through the resonators' face while fluid flow into the resonators is for the most part excluded.

The longitudinal openings need not be evenly spread over the face of the resonators. That is, some portions of the face may be completely solid.

The disclosed series resonators can constitute more than three rows of resonators. In this case, the sequence of low fundamental frequency, followed by high fundamental frequency is continued, usually tuned to slightly varying frequencies to obtain a broader bandwidth.

The sequence of the resonators also can be reversed; the high resonator can come before the low resonators.

Resonators on one side of the duct need not be symmetrical with those on the opposite side of the duct. For example, the smaller resonators of the series may be omitted on one side.

Resonator depth of the fundamentally tuned resonator rows is preferably slightly less than ¼ of the wave length where the depth is the maximum distance from the opening or perforate portion of the facing. The bottom of the resonator is measured from a point where the cross section of the resonator is 10% or less of the maximum resonator cross section. Reinforcement of the resonator cavities is preferred, typically using a system of structural baffles dimensioned to resonate at harmonics or at the primary frequency.

Regarding the second or shallow resonator row, a preferred design is disclosed. These resonators are formed utilizing a baffle sloped between the forward and rearward wall of the resonator line. This sloped baffle defines on one side a relatively deep resonator while forming at its upwardly sloped flow exposed surface the required shallow resonators. The creation of the required intermediate resonators is particularly efficient utilizing the sloped baffle. The preferred total combined length of the first and second resonator row is between ⅛ and ⅜ of the fundamental frequency wave length.

According to a preferred embodiment, the tops of the Helmholtz type resonators are formed by rigid parallel spaced apart steel strips laid longitudinally in the direction of fluid flow. These rigid steel strips form the top of the Helmholtz resonators. The strips are separated by rectilinear intervals overlying the Helmholtz resonators so that the spacial interval in between the strips forms the constricted Helmholtz resonator opening. Consequently, a low resistance flow path is formed while the kinetic energy of gas resonating in the resonators is conserved, rather than being discharged to the passing fluid flow, as it would with, for example, round perforations.

An embodiment is disclosed wherein elongate slots, perpendicular to the flow, or even round holes can be utilized. In this embodiment, the upstream rounded lip of each of the perforations is preferably at a different elevation with respect to the passing fluid flow than the downstream rounded lip. It is preferred that the upstream lip be elevated by 2° or more (as compared to a non offset opening) with respect to the downstream lip to prevent natural resonation of the Helmholtz resonators by the passing gas.

Relative to the edge of the flow passage, the downstream edge of the openings can be disposed up to 60° to the flow to avoid flow-induced howl and to decrease flow resistance. If a rounded downstream edge is used, it should have a radius of at least 5% of the resonator face opening—whichever is greater—measured in the direction of the adjacent flow.

The resonators can have facing apertures that are of unequal area, to provide greater bandwidth of attenuation. In this case, the preferred less open resonator openings are of at least 5% less open area than the large open area to promote a wider attenuation band.

It is important that any acoustic dissipation effects present be minimized at the fundamental frequency or any specific frequency to which the resonators are tuned. Accordingly, introduction of micro-porous, fibrous, or other acoustical absorptive materials or liners be effective only at frequencies of at least twice the fundamental or specific frequency to which the resonator is tuned.

The resonators themselves can form parallel baffles, annular rings or rectangles. They can be lined with acoustical materials providing that no sound absorptive materials in the resonator cavities have a 25% or greater sound absorption coefficient at the fundamental resonant frequency of the subject resonator.

The length of the resonators in the direction of flow can be important. I prefer that the length of the resonator series in the direction of flow be between ⅛ and ⅜ wave length of the tuned deep resonance. In the absence of such length dimensions, so-called "pass-bands"'—frequencies directly related to the attenuated frequencies—may pass through the muffler within the frequency bands where the greatest attenuation is desired. In short, the desired attenuation becomes erratic or "ragged". This erratic attenuation can result where the spacing length is within ⅛ of the low frequency resonance wave length.

BRIEF DESCRIPTION OF THE DRAWINGS

Other objects, features and advantages of this invention will be more apparent after referring to the following specification and attached drawings in which.

DESCRIPTION OF THE PREFERRED EMBODIMENT

Figure 1:
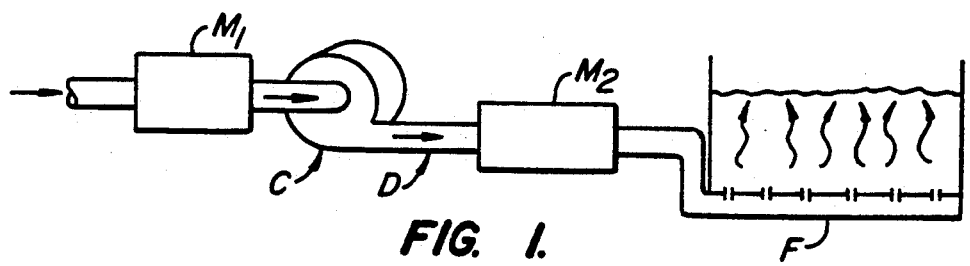
FIG. 1 is an operative schematic of the fluidized bed power plant emphasizing the muffler of this invention placed in the duct between the rotating turbo fan machinery and the fluidized bed.

Referring to FIG. 1, a muffler $M_1$ is shown at the inlet to rotatory compressor C with outlet duct D. Muffler $M_2$ is at the outlet with duct D going to the bottom of fluidized bed F.

Figure 2:
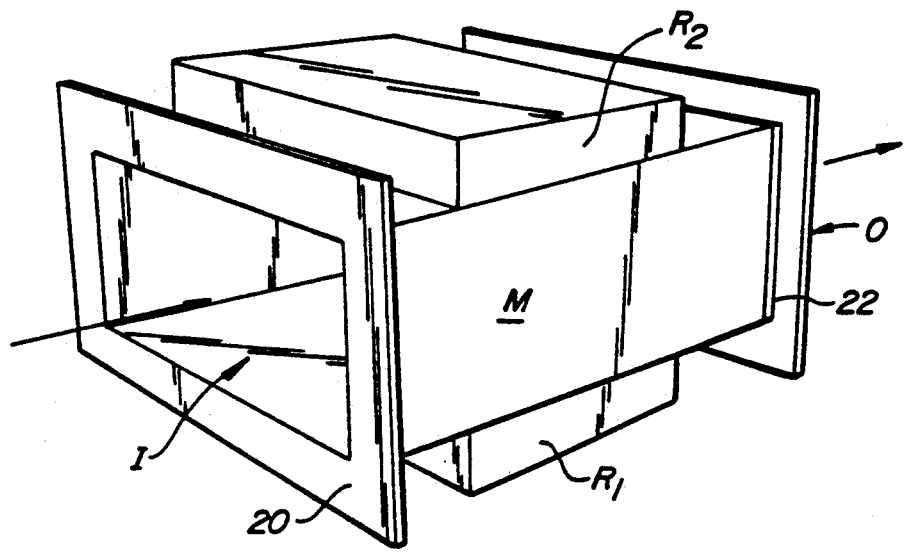
FIG. 2 is a perspective view of the muffler of this invention from the exterior thereof.

With respect to the perspective view of FIG. 2, a typical muffler M is shown having inlet I, outlet O and opposed resonator cavities $R_1$ and $R_2$. As can be seen, the passage of the muffler M is rectilinear in section having an aspect ratio in the range of 3 to 1. In this case it includes resonator cavities $R_1$ and $R_2$ on both sides thereof; in some embodiments a single such resonator cavity will produce the desired muffling with reflection of the required absorbed sound waves from a plane duct wall. The reader will understand that the muffler must be of extremely rigid construction. Consequently, bracing or partitions may be added to the exterior of the muffler as required.

Inlet I and outlet O are surrounded by appropriate flanges 20, 22. These members are rigidly fastened to the remainder of the duct.

Figure 3:
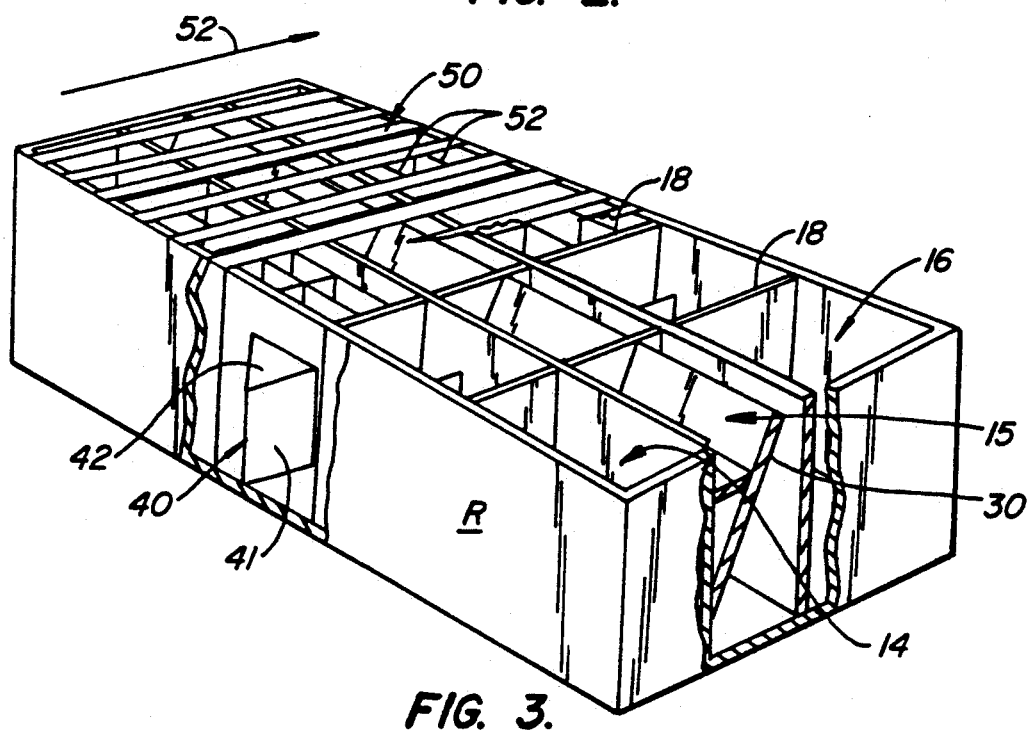
FIG. 3 is a cut away view of the muffler of FIG. 2 illustrating the preferred longitudinally separated strips overlying and forming the acoustical entry to the underlying Helmholtz type resonators.

Referring to FIG. 3, attention can now be directed to a typical resonator R. The resonator R includes an upstream fundamental frequency resonator row 14, an intermediate higher frequency or fundamental frequency excluding row 15, and a downstream fundamental frequency excluding row 16.

Each row can be provided with primary baffles 18 to effectively subdivide the discrete resonator cavities along the rows 14, 15, 16 as well as to impart sufficient rigidity to resonator R and muffler M. Two features of the resonator cavities here illustrated are worthy of special mention.

First, fundamental exclusionary resonator row 15 is formed with a sloped wall 30. This sloped wall forms above its surface the required exclusionary resonator row 15 and defines on the other side low frequency resonators which can be complimentary to resonator row 16.

Secondly, and because of the relatively great energy absorbed, it is desirable to reinforce the discrete resonators with bottom baffles 40 including longitudinal walls 41 and transverse walls 42. Further, these walls can be dimensioned so as to define cavities which resonate at harmonics of the captured fundamental frequency.

It is required for this invention that Helmholtz type resonators be utilized. To this end the top of the resonator R is covered by a series of metal strips 50, these strips being individually disposed parallel to the direction of fluid flow.

Construction is sturdy. Two inch wide bar that is one-half inch thick of steel construction is used for metal strips 50. Two and one-quarter inch spacing is used between the bars. At substantially all available surfaces, bars 50 are welded to the underlying resonators—also of suitable and similar sturdy construction. Cross members 52 can be welded between the steel strips for further reinforcement of the structure.

Covering of resonator rows 14, 15, and 16 causes the resonator cavities to become Helmholtz type cavities. In short, these cavities capture sonic energy at their respective resonate frequencies.

Other openings can be used to cover the resonating cavities and produce the desired sonic muffling. This is illustrated in FIGS. 4A-4D and FIG. 5.

Figure 4A:
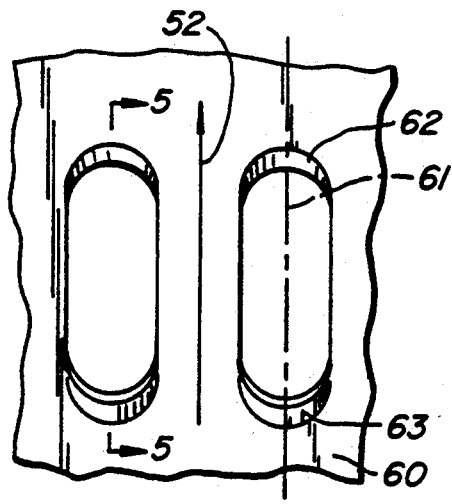
FIGS. 4A-4D illustrating various perforate sheeting which can overly and form the acoustical entry to the underlying Helmholtz type resonators; and, FIG. 5 is a detail taken at one of the perforations of shown in FIG. 4A illustrating the preferred elevated upstream lip and depressed downstream lip for the low flow attenuation muffling within the Helmholtz type resonators.

Referring to FIG. 4A, oblong opening 60 is shown with major axis 61 parallel to fluid flow 52. As shown both in FIGS. 4A and 5, it is preferred in all such openings that the respective leading edges 63 be at a different elevation than the trailing edges 62 of the respective Helmholtz cavity apertures illustrated. It is further preferred that the downstream resonator lip 62 be below the upstream resonator lip 63 so as to prevent "whistle like" self resonation of the cavity by the passing air stream 52.

Figure 4B:
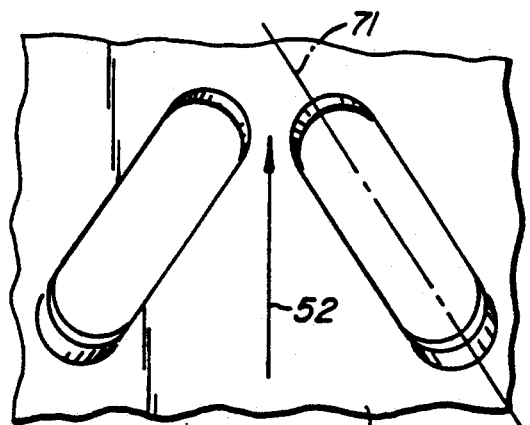
Figure 4C:
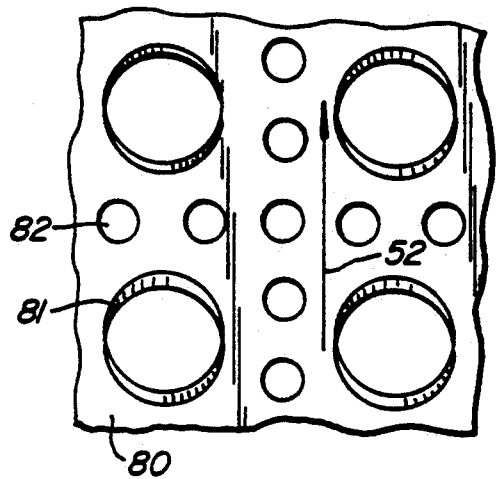
Figure 4D:
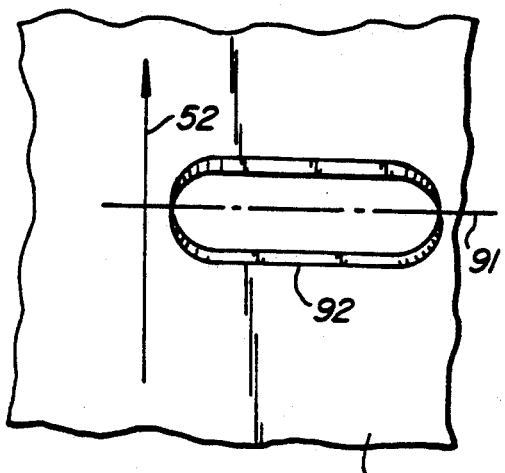
Figure 5:
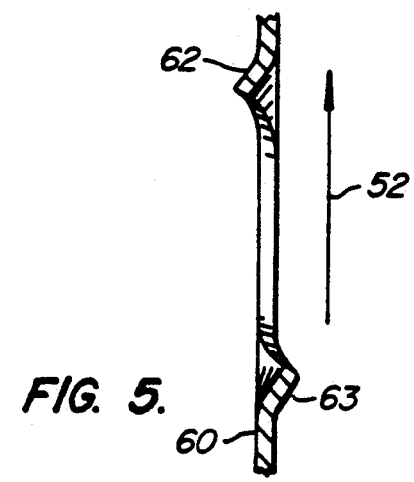

Referring to FIG. 4B, it is not necessary that the major axis 71 of the apertures be parallel to fluid flow 52. Canting of the elongate apertures as shown in plate 70 can occur.

Further, the apertures can be circular and arrayed in rows and columns as shown by large circular apertures 81 and small circular apertures 82 in sheet 80.

Finally, apertures 92 can have their major axis 91 transverse to flow 52 with the respective elongate sides of the apertures forming the upstream and downstream lips of the resonator openings.

What is claimed is:

1. In a muffler for a gas flow, wherein said muffler is of the type having:
    a muffler housing having an opening to receive said gas flow and exit for discharging said gas flow;
    at least first upstream and second downstream rows of resonators placed in series with the second row of resonators behind the first row of resonators, said resonator having openings communicating to said gas flow;
    one of said rows of said resonators being tuned to a fundamental low frequency;
    another of said rows of said resonators being tuned to exclude said low frequency by receiving frequencies higher than said low frequency whereby a majority of sound at said fundamental frequency is maintained to the inlet of said muffler housing and away from the outlet of said muffler housing;

the improvement to said muffler comprising in combination:

a surface placed at least partially over openings of said resonators to cause said resonators to become Helmholtz resonators, said surface defining elongate openings disposed with the major axis substantially parallel to said passing gas flow for permitting said passing gas flow to transmit acoustical energy into said resonators with reduced pressure loss to said passing gas flow; and said openings defining from 5% to 75% of the flow surface covering said resonators over which said gas flows and having said elongate apertures defining a length at least 1¼ times said width.

2. The muffler of claim 1 and wherein said openings having an upstream edge at a first elevation with respect to said passing gas flow, said openings having a downstream edge at a second elevation with respect to said passing gas flow, said respective elevations being at differing distances from a path of gas flowing over said upstream and downstream edges.

3. The muffler of claim 1 and wherein said surface placed at least partially over the openings of said resonators includes:

spaced apart parallel rigid strips disposed generally in the direction of gas flow;

said spaced apart parallel strips forming under their respective surfaces an upper portion of Helmholtz resonators;

said spaced apart parallel strips forming between their respective side edges the openings to Helmholtz resonators;

said Helmholtz resonators and said opening to said Helmholtz resonators being tuned in said first upstream row to resonate at said fundamental frequency and being tuned in said second downstream row to resonate at a higher frequency excluding said fundamental frequency.

4. The muffler of claim 1 and including a third row of resonators, said third row being downstream of second row and tuned to resonate within 2% to 30% of said fundamental frequency.

5. The muffler of claim 1 and wherein a frontal cross section flow area at said resonators is at least 30% of a total frontal flow area of said muffler taken along a plane normal to said gas flow.

6. The muffler of claim 5 and wherein said rows of resonators are placed on opposite major sides of said muffler housing.

7. The muffler of claim 1 and wherein said muffler housing is not tapered.

8. The muffler of claim 1 and wherein said second downstream row of resonators are tuned to harmonics of said fundamental frequency.

9. The muffler of claim 1 and wherein said second row of resonators is defined by at least one boundary that includes a sloped baffle forming a wall of said resonators with said sloped baffle defining lower frequency resonators on one side thereof and higher frequency resonators on the other side thereof.

10. In a muffler for high pressure, high volume compressed gas flow having a compressor source discharging said gas with sound containing at least one fundamental low frequency, said muffler comprising:

a muffler housing having an opening to receive said gas flow and exit for discharging said gas flow;

at least first upstream and second downstream rows of resonators placed in series with the second row of resonators behind the first row of resonators, said resonator having openings communicating to said gas flow;

said first row of said resonators being tuned to said fundamental low frequency;

said second row of said resonators being tuned to exclude said fundamental low frequency by receiving frequencies higher than said fundamental low frequency whereby a majority of sound at said fundamental frequency is maintained to the inlet of said muffler housing and away from the outlet of said muffler housing;

a surface placed at least partially over the openings of said resonators to cause said resonators to become Helmholtz resonators, said surface defining openings to said passing gas flow for permitting said passing gas flow to transmit acoustical energy into said resonators with reduced pressure loss to said passing gas flow; and, said openings are elongate openings with a major axis of said elongate openings being disposed generally in the direction of gas flow and said openings having a length along said major axis at least 1¼ times opening width normal to said major axis.

11. The muffler of claim 10 and wherein said surface placed at least partially over the openings of said resonators includes:

spaced apart parallel rigid strips disposed generally in the direction of gas flow;

said spaced apart parallel strips forming under their respective surfaces an upper portion of Helmholtz resonators;

said spaced apart parallel strips forming between their respective side edges an opening area to Helmholtz resonators;

said Helmholtz resonators defining a volume and opening area to said Helmholtz resonators tuned in said first row to resonate at said fundamental frequency and being tuned in said second row to resonate at a higher frequency excluding said fundamental frequency.

12. The muffler of claim 10 and including a third row of resonators, said third row being downstream of second row and tuned to resonate at said fundamental frequency.

13. The muffler of claim 10 and wherein said housing is cross section is rectilinear with a height to width aspect ratio of at least three to one.

14. The muffler of claim 10 and wherein said first row of Helmholtz resonators each define a resonator depth is less than ¼ wave length of said fundamental frequency.

15. The muffler of claim 10 and including a third row of resonators tuned in the range of said fundamental frequency at a frequency slightly different from said first row of resonators.

16. The muffler of claim 11 and wherein:

said elongate slots have an upstream lip displaced by at least 2° with respect to a downstream lip.

17. The muffler of claim 16 and wherein:

said downstream lip is depressed below said upstream lip.

18. In a muffler for a gas flow having sound passing from an upstream opening to a downstream discharge, wherein said muffler is of the type having:
   a muffler housing having an opening to receive gas flow and exit for discharging said gas flow;
   at least one row of resonators placed across said muffler, said resonators having openings communicating to said gas flow;
   a surface placed at least partially over the openings of said resonators to cause said resonators to become Helmholtz resonators, said surface defining openings to said passing gas flow for permitting said passing gas flow to transmit acoustical energy into said resonators with reduced pressure loss to said passing gas flow; and
   said openings having an upstream edge at a first elevation with respect to said passing gas flow, said openings having a downstream edge at a second elevation with respect to said passing gas flow, said respective elevations being at differing distances from a path of gas flowing over said upstream and downstream edges.

19. The invention of claim 18 and wherein said upstream edge of said openings is at a higher elevation with respect to said passing gas flow than said downstream edge.

20. The invention of claim 18 and wherein said openings are elongate about a major axis.

21. The invention of claim 20 and wherein said elongate openings are parallel to said gas flow at the major axis of said elongate openings.

* * * * *